United States Patent
Heinl

(10) Patent No.: US 6,788,856 B2
(45) Date of Patent: Sep. 7, 2004

(54) OPTICAL FIBER CABLE WITH WATERPROOFING AGENT

(75) Inventor: Dieter Heinl, Börfles Esbach (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 10/306,134

(22) Filed: Nov. 27, 2002

(65) Prior Publication Data

US 2003/0103741 A1 Jun. 5, 2003

(30) Foreign Application Priority Data

Nov. 30, 2001 (DE) .......................................... 101 58 863

(51) Int. Cl.⁷ ................................................. G02B 6/44
(52) U.S. Cl. ..................................................... 385/100
(58) Field of Search ................................ 385/100, 102

(56) References Cited

U.S. PATENT DOCUMENTS

| | | | | |
|---|---|---|---|---|
| 4,671,611 A | * | 6/1987 | Allemand et al. .......... | 385/107 |
| 4,956,039 A | * | 9/1990 | Olesen et al. ................ | 156/180 |
| 5,039,197 A | | 8/1991 | Rawlyk ....................... | 385/102 |
| 5,188,883 A | | 2/1993 | Rawlyk ....................... | 428/189 |
| 5,388,175 A | | 2/1995 | Clarke ......................... | 385/100 |
| 5,455,881 A | | 10/1995 | Bosisio et al. .............. | 385/100 |
| 5,684,904 A | | 11/1997 | Bringuier et al. ........... | 385/109 |
| 5,838,863 A | | 11/1998 | Fujiura et al. .............. | 385/103 |
| 6,253,012 B1 | | 6/2001 | Keller et al. ................. | 385/109 |
| 6,278,826 B1 | * | 8/2001 | Sheu ........................... | 385/109 |
| 6,301,413 B1 | | 10/2001 | Bringuier .................... | 385/100 |
| 6,304,699 B2 | | 10/2001 | Field et al. .................. | 385/100 |

FOREIGN PATENT DOCUMENTS

| | | | | |
|---|---|---|---|---|
| DE | 68926730 T2 | 11/1996 | ............ | G02B/6/00 |
| EP | 0308143 A1 | 3/1989 | ............ | G02B/6/44 |

OTHER PUBLICATIONS

ATOFINA, "Superabsorbent Polymers", Aug. 2000.

* cited by examiner

Primary Examiner—Hae Moon Hyeon

(57) ABSTRACT

Optical fiber cable with at least one optical fiber, with a jacket enclosing each and every optical fiber, and a waterproofing agent, wherein the waterproofing agent comprises a duroplastic support material and a swell powder embedded into the duroplastic support material.

7 Claims, No Drawings

OPTICAL FIBER CABLE WITH WATERPROOFING AGENT

FIELD OF THE INVENTION

The present invention relates to compounds for use in optical fiber cables, and, more particularly, relates to compounds used as waterblocking or inhibiting agents in such cables.

BACKGROUND OF THE INVENTION

A frequent requirement of optical fiber cables is impermeability to water or also longitudinal impermeability to water of the same. To achieve longitudinal impermeability to water, waterproofing agents are added to the optical fiber cables.

To ensure impermeability to water, state-of-the-art optical fiber cables are known, which have a gel-like filling compound as a waterproofing agent. This gel-like filling compound is inserted-into the optical fiber cable between the jacket of the optical fiber cable and the optical fibers enclosed by the jacket. In order to have access to the individual optical fibers during subsequent installation of the optical fiber cable, the jacket and the gel-like filling compound have to be removed. The removal of the gel-like filling compound and the cleaning of the optical fibers of the gel-like filling compound is very time consuming.

Additionally, so-called "dry" state-of-the-art optical fiber cables are known from. For such "dry" optical fiber cables, water impermeability is achieved by swell fleece as waterproofing agent, which replaces the gel-like filling compounds. Such swell fleece is formed as ribbons or yarns coated with so-called SAPs (Super Absorbent Polymers). Also known are "dry" optical fiber cables, where water impermeability is achieved by means of swell powder, where the swell powder is formed as SAP (Super Absorbent Polymer) and embedded into a thermoplastic support material—so-called melt glues or hot melts. The mixture of thermoplastic support material and swell powder has to be processed under influence of temperature during the extrusion of the optical fiber cable jacket.

SUMMARY OF THE INVENTIONS

Optical fiber cable with at least one optical fiber, with a jacket enclosing each and every optical fiber, and a waterproofing agent, wherein the waterproofing agent comprises a duroplastic support material and a swell powder embedded into the duroplastic support material. In one of many embodiments of the present invention, the waterproofing agent can be characterized as a hydrophilic epoxy resin.

In a method of processing, the swellable, hydrophilic epoxy resin mixture is mixed with the second component of the duroplastic support material, namely the hardener. Here the mixing ratio coordinated with the epoxy equivalent is in the range of 0.9 to 1.1, preferably 1:1.

DETAILED DESCRIPTION OF THE INVENTIONS

The waterproofing agent is formed according to the invention by a duroplastic support material and a swell powder embedded into the duroplastic support material. The duroplastic support material is a cold setting, two-component matrix. A first component of the duroplastic support material or the two component matrix, respectively, is an epoxy resin mixture. The second component of the duroplastic support material is an amine hardener. The swell powder is a so-called SAP (Super Absorbent Polymer).

The epoxy resin mixture can be a single, pure epoxy resin or a mixture of several epoxy resins. Examples for starting components are resins on the basis of bisphenol-A-diglycidylether, Bisphenol-F-diglycidylether, Butandioldiglycidylether, Hexandiol-diglycidylether, core-substituted Phenolglycidylether, urethane or rubber modified epoxy as well as other commercial materials such as epoxidized soybean oil.

The epoxy resin mixture preferably has the following composition: low-viscosity mixture of Bisphenol-F-diglycidylether, hexandioldiglycidylether and long chain glycidylethers.

The amine hardener also can be a single, pure amine or polyamine or a mixture of several of these substances. Examples are diethylentriamine, triethylentriamine, isophorondiamine, N-aminoethyl-piperazine as well as other polyamines.

As preferred hardener a mixture of N-aminoethyl-piperazine and isophorodiamine, coordinated with the epoxy equivalent, is used.

For the Super Absorbent Polymer a partially crosslinked acrylate such as Norsocryl by Atofino is used.

The use according to the invention of a duroplastic support material for forming a waterproofing agent vs. the use of hot melts as support material has the advantage, that waterproofing agents based on a duroplastic support material can be processed cold. Problems with thermoplastic support materials during production stoppages are thus eliminated. Thermoplastic support materials, which have to be processed with heat, can be damaged by repeated heating. Another advantage of the invention is found in the significantly lower viscosity of the duroplastic support material. It can be applied more evenly by spraying onto the components of construction groups of the optical fiber cable.

The use of a duroplastic support material has the additional advantage, that the absorption of dampness penetrating into the optical fiber cable is faster than with the state-of-the-art known systems due to increased hydrophilic quality of the cross-linked epoxy resin.

The manufacture of an optical fiber cable according to the invention or the preparation of the waterproofing agent, respectively, proceeds in such a way, that the first component of the duroplastic support material, namely the hydrophilic epoxy resin mixture, is mixed with the swell powder. In this way, a swellable hydrophilic epoxy resin mixture results. The mixing ratio of the hydrophilic epoxy resins mixture and the swell powder is in the range of 10:1 to 1:1, preferably 5:1.

For processing, the swellable, hydrophilic epoxy resin mixture is mixed with the second component of the duroplastic support material, namely the hardener. Here the mixing ratio coordinated with the epoxy equivalent is in the range of 0.9 to 1.1, preferably 1:1.

This mixture can then be sprayed directly onto the cable components in the form of a spray fog prior to the extrusion of the jacket. During production stoppage the flow of hardener and swellable epoxy resin mixture is also stopped. The hardener as well as the swellable epoxy resin mixture by themselves have an almost limitless storage time under appropriate environmental conditions.

What is claimed is:

1. An optical fiber cable with at least one optical fiber, with a jacket enclosing each and every optical fiber and a waterproofing agent, the waterproofing agent comprising a duroplastic support material and a swell powder embedded into the duroplastic support material.

2. The optical fiber cable according to claim 1, wherein the duroplastic support material is formed by a two-component matrix.

3. The optical fiber cable according to claim 2, wherein a first component of the two-component matrix is an epoxy resin mixture.

4. The optical fiber cable according to claim 3, wherein the epoxy resin mixture has a low viscosity at room temperature.

5. The optical fiber cable according to claim 2, wherein a second component of the two-component matrix is a hardener.

6. The optical fiber cable according to claim 5, wherein the hardener comprises one or more low viscosity, cold cross-linked amines.

7. The optical fiber cable according to claim 2, wherein the waterproofing agent consisting of the duroplastic support material and the swell powder is sprayed onto at least one component of the optical fiber cable.

* * * * *